(12) United States Patent
Scarinci et al.

(10) Patent No.: US 9,803,959 B2
(45) Date of Patent: Oct. 31, 2017

(54) REDUCED WEIGHT ARMOR SYSTEMS AND METHODS OF MANUFACTURING THE SAME

(71) Applicant: PPG Industries Ohio, Inc., Pittsburgh, PA (US)

(72) Inventors: Carlo Scarinci, Pittsburgh, PA (US); David Palermo, Pittsburgh, PA (US)

(73) Assignee: PPG Industries Ohio, Inc., Pittsburgh, PA (US)

( * ) Notice: Subject to any disclaimer, the term of this patent is extended or adjusted under 35 U.S.C. 154(b) by 102 days.

(21) Appl. No.: 14/318,195

(22) Filed: Jun. 27, 2014

(65) Prior Publication Data

US 2015/0377595 A1   Dec. 31, 2015

(51) Int. Cl.
*F41H 5/013* (2006.01)
*F41H 5/04* (2006.01)
(Continued)

(52) U.S. Cl.
CPC ..... *F41H 5/0428* (2013.01); *B32B 17/10045* (2013.01); *B32B 17/1077* (2013.01); *B32B 17/10293* (2013.01); *B32B 17/10761* (2013.01); *B32B 17/10788* (2013.01); *F41H 5/013* (2013.01); *F41H 5/0407* (2013.01); *F41H 5/263* (2013.01); *B32B 37/04* (2013.01);
(Continued)

(58) Field of Classification Search
CPC ... B32B 37/06; B32B 37/10; B32B 2037/546; B32B 2037/558; B32B 2039/022; B32B 2311/00; B32B 2323/04; B32B 2323/10; B32B 2329/06; B32B 2331/04; B32B 2367/00; B32B 2369/00; B32B 2375/00; B32B 2571/02; F41H 5/013; F41H 5/02; F41H 5/04; F41H 5/0407; F41H 5/0414–5/0435; F41H 5/0442–5/0464; F41H 5/0471–5/0485; F41H 5/0492; F41H 7/04

See application file for complete search history.

(56) References Cited

U.S. PATENT DOCUMENTS 2,410,022 A * 10/1946 Dumais ............... F41H 5/04
                                                  52/408
2,991,209 A *  7/1961 Worrall ............... B32B 17/10
                                                  156/99

(Continued)

FOREIGN PATENT DOCUMENTS

DE        899605 C  * 12/1953 .............. B21J 15/02
DE     1653706 A1  *  4/1971 .............. F41H 5/013
(Continued)

*Primary Examiner* — Glenn Dayoan
*Assistant Examiner* — Paul Chenevert
(74) *Attorney, Agent, or Firm* — Lewis Roca Rothgerber Christie LLP

(57) ABSTRACT

An armor system configured to be coupled to a frame surrounding a window in a vehicle or other structure, such as a building. The armor system may be configured to provide any desired ballistics protection rating. The armor system includes a ballistics-grade armor panel and at least one insert embedded in the ballistics-grade armor panel. The insert extends around at least a portion of a periphery of the ballistics-grade armor panel. The one or more inserts may be configured to reduce the parasitic weight of the armor system.

19 Claims, 6 Drawing Sheets

(51) Int. Cl.
*F41H 5/26* (2006.01)
*B32B 17/10* (2006.01)
*B32B 37/04* (2006.01)

(52) U.S. Cl.
CPC ... *B32B 2307/546* (2013.01); *B32B 2307/558* (2013.01); *B32B 2309/02* (2013.01); *B32B 2311/00* (2013.01); *B32B 2315/08* (2013.01); *B32B 2323/04* (2013.01); *B32B 2323/10* (2013.01); *B32B 2329/06* (2013.01); *B32B 2331/04* (2013.01); *B32B 2367/00* (2013.01); *B32B 2369/00* (2013.01); *B32B 2375/00* (2013.01); *B32B 2571/02* (2013.01)

(56) References Cited

U.S. PATENT DOCUMENTS

| | | | | |
|---|---|---|---|---|
| 3,380,406 A * | 4/1968 | Gosnell | F41H 5/0407 109/80 |
| 3,624,238 A * | 11/1971 | McKenzie | B32B 17/10 351/159.57 |
| 3,776,094 A * | 12/1973 | Gilles | F41H 7/04 109/49.5 |
| 4,081,581 A * | 3/1978 | Littell, Jr. | B32B 17/10018 244/121 |
| 4,550,044 A * | 10/1985 | Rosenberg | B32B 19/06 156/290 |
| 4,716,810 A * | 1/1988 | DeGuvera | F41H 5/013 109/83 |
| 4,932,608 A * | 6/1990 | Heidish | B32B 17/10 244/129.3 |
| 5,002,820 A * | 3/1991 | Bolton | B32B 17/10018 428/215 |
| 5,032,466 A * | 7/1991 | Cappa | B32B 18/00 428/625 |
| 5,229,204 A * | 7/1993 | Labock | B32B 17/10018 109/10 |
| 5,271,311 A * | 12/1993 | Madden, Jr. | B60R 21/12 89/36.02 |
| 5,398,592 A * | 3/1995 | Turner | F41H 7/04 89/36.02 |
| 5,594,193 A * | 1/1997 | Sheridan | F41H 5/013 109/49.5 |
| 5,668,344 A * | 9/1997 | Bornstein | F41H 5/0485 428/911 |
| 5,670,734 A * | 9/1997 | Middione | F41H 5/013 296/187.07 |
| 5,723,807 A * | 3/1998 | Kuhn, II | F41H 5/013 89/36.02 |
| 6,129,974 A * | 10/2000 | Woll | B32B 17/10045 428/192 |
| 6,327,954 B1 * | 12/2001 | Medlin | F41H 5/0407 296/96.21 |
| 6,546,692 B1 * | 4/2003 | Duncan | B32B 17/10018 52/786.11 |
| 6,569,787 B1 * | 5/2003 | Snelling | B32B 17/10293 2/2.5 |
| 6,708,595 B1 * | 3/2004 | Chaussade | B32B 17/10064 428/911 |
| 6,818,268 B2 * | 11/2004 | Gonzalez | F41H 5/263 296/96.14 |
| 7,225,717 B2 * | 6/2007 | Williams | F41H 7/04 89/36.01 |
| 7,698,985 B2 * | 4/2010 | Tapp | F41H 5/013 89/36.02 |
| 7,823,498 B2 * | 11/2010 | Schneider | F41H 5/20 89/36.08 |
| 7,854,190 B2 * | 12/2010 | Speyer | C04B 35/56 423/291 |
| 8,088,462 B1 * | 1/2012 | Cockman | F41H 5/0407 150/166 |
| 8,088,472 B2 * | 1/2012 | Mannheim Astete | B32B 17/10045 428/212 |
| 8,689,671 B2 * | 4/2014 | Hummel | F41H 5/0414 428/300.7 |
| 8,763,512 B2 * | 7/2014 | Terrenzi | F41H 5/0457 89/36.02 |
| 8,906,484 B1 * | 12/2014 | Black, Jr. | B32B 5/12 428/105 |
| 9,040,160 B2 * | 5/2015 | Carberry | F41H 5/0407 428/212 |
| 9,532,447 B2 * | 12/2016 | Ohata | H05K 1/0353 |
| 2001/0032540 A1 * | 10/2001 | Gourio | B32B 17/10064 89/36.02 |
| 2005/0087064 A1 * | 4/2005 | Cohen | F41H 5/023 89/36.04 |
| 2006/0252328 A1 * | 11/2006 | Bingenheimer | B32B 5/12 442/180 |
| 2008/0187721 A1 * | 8/2008 | Engl | B32B 17/10045 428/172 |
| 2009/0047453 A1 * | 2/2009 | Folaron | B61D 49/00 428/34.1 |
| 2009/0282968 A1 * | 11/2009 | Colliflower | F41H 5/0471 89/36.02 |
| 2011/0185884 A1 * | 8/2011 | Kruger | B32B 7/12 89/36.02 |
| 2012/0103178 A1 * | 5/2012 | Dijkman | F41H 5/04 89/36.02 |
| 2012/0160084 A1 * | 6/2012 | Mosser | B23K 1/0008 89/36.02 |
| 2012/0204711 A1 * | 8/2012 | Engleman | F41H 5/007 89/36.02 |
| 2013/0284339 A1 * | 10/2013 | Cellarius | B64F 5/0009 156/60 |
| 2014/0060306 A1 * | 3/2014 | Bertolini | F41H 5/0407 89/36.02 |
| 2014/0144313 A1 * | 5/2014 | Bertolini | F41H 7/04 89/36.08 |
| 2015/0024165 A1 * | 1/2015 | Gilde | F41H 5/0407 428/134 |
| 2015/0114211 A1 * | 4/2015 | Medwell | F41H 5/013 89/36.02 |
| 2015/0211830 A1 * | 7/2015 | Xu | F41H 5/02 89/36.02 |
| 2015/0268007 A1 * | 9/2015 | Bergman | B64D 7/00 89/36.02 |
| 2015/0268009 A1 * | 9/2015 | Tunis, III | B29C 65/5057 89/36.02 |
| 2015/0292838 A1 * | 10/2015 | Shoshan | F41H 5/013 89/36.02 |
| 2015/0300784 A1 * | 10/2015 | Scarinci | F41H 5/013 89/36.02 |
| 2016/0152015 A1 * | 6/2016 | Unvericht | B32B 27/20 428/141 |
| 2016/0265882 A1 * | 9/2016 | Singletary | F41H 5/04 |

FOREIGN PATENT DOCUMENTS

| | | | | |
|---|---|---|---|---|
| DE | 4230073 A1 * | 3/1994 | | B32B 17/10073 |
| DE | 9314982 U1 * | 3/1994 | | F41H 5/013 |
| DE | 4415879 A1 * | 11/1995 | | B32B 17/10045 |
| DE | 19914538 A1 * | 10/2000 | | B60R 13/0206 |
| DE | 10043793 A1 * | 3/2002 | | B32B 17/10293 |
| DE | 10244368 A1 * | 4/2004 | | B32B 17/10045 |
| DE | EP 1916496 A1 * | 4/2008 | | F41H 5/013 |
| DE | 102009060923 A1 * | 8/2011 | | F41H 5/0421 |
| DE | 102014209212 A1 * | 11/2015 | | E06B 3/06 |
| FR | 816814 A * | 8/1937 | | F41H 5/04 |
| WO | WO 2008127272 A1 * | 10/2008 | | F41H 5/013 |
| WO | WO 2008140480 A1 * | 11/2008 | | B32B 17/10027 |
| ZA | WO 2005045351 A1 * | 5/2005 | | C22C 38/001 |

* cited by examiner

REDUCED WEIGHT ARMOR SYSTEMS AND METHODS OF MANUFACTURING THE SAME

FIELD

The present disclosure relates generally to armor and, more particularly, to armor having embedded inserts.

BACKGROUND

Armor systems are commonly incorporated into vehicles (e.g., land assault vehicles, personnel carriers, aircraft, and naval ships) and other structures (e.g., buildings, bunkers, and barricades) to protect personnel and property against ballistic strikes (e.g., projectiles and shrapnel) and percussive waves associated with a nearby explosion. Conventional armor systems typically include a ballistics-grade armor panel and a metallic channel or frame (e.g., a C-channel or a Z-channel) extending around the periphery of the ballistics-grade armor panel. The channel is configured to facilitate attachment of the armor system to a vehicle or other structure. For instance, the channel may be configured to overlap a frame surrounding a window in a vehicle such that the armor system may be attached to the vehicle with a series of mechanical fasteners extending through the channel and into the frame of the vehicle. These conventional channels, however, increase the parasitic weight of the overall armor system and thereby adversely affect the performance of the vehicle (e.g., by limiting speed and increasing fuel consumption) into which the armor system is incorporated and increase the difficulty of installing the armor system. Furthermore, conventional armor panels are commonly potted with a sealant into the channel, which both increases the parasitic weight of the armor system and increases the complexity of manufacturing the armor system. Additionally, the region of overlap between the armor panel and the channel is overdesigned and redundant because both the armor panel and the channel provide ballistics protection. Similarly, any region of overlap between the armor panel and the frame of the vehicle or other structure into which the armor panel is incorporated is overdesigned and redundant. These overdesigned regions in conventional armor systems result in the conventional armor systems being weight-inefficient. Additionally, some conventional armor systems incorporate an armor panel formed from exotic ballistics-grade materials, such as transparent ceramics, to reduce the parasitic weight of the armor system. However, such exotic ballistics-grade materials are cost-inefficient and/or may not be as readily available as conventional armor panel materials, such as glass.

SUMMARY

The present disclosure is directed to various embodiments of armor systems configured to be attached to a vehicle or other structure, such as a building, and thereby protect personnel against ballistic strikes and percussive waves associated with a nearby blast. In one embodiment, the armor includes a ballistics-grade armor panel and at least one insert embedded in the ballistics-grade armor panel. The at least one insert has a mass density less than a mass density of the ballistics-grade armor panel. The insert may extend around at least a portion of a periphery of the ballistics-grade armor panel. The armor system may also include a bracket configured to couple the armor system to a vehicle or a structure. A portion of the bracket may be configured to overlap at least a portion of the at least one insert embedded in the armor panel. The armor system may also include at least one fastener extending through the portion of the bracket overlapping the at least one insert and through the at least one insert. The bracket may have any desired shape, such as a flat plate, a Z-channel, or a mullion and a cover plate. The armor panel may be made out of any desired material, such as glass, interlayer, acrylic, polycarbonate, plastic, transparent ceramic, ionomers, ionoplasts, or any combinations thereof. The insert may be made out of any desired material, such as ceramics, metals, aramids, polyethylene, polypropylene, or glass fibers impregnated with a resin. The ballistics-grade armor panel may include a stack of alternating glass layers and interlayers, the at least one insert may include a first insert spaced from a second insert, and at least one glass layer and one interlayer may extend between the first and second inserts. The first insert may be on an outer surface of the ballistics-grade armor panel and the second insert may be on an inner surface of the ballistics-grade armor panel.

The present disclosure is also directed to various embodiments of an armored vehicle. In one embodiment, the armored vehicle includes at least one window, a frame surrounding the at least one window, and an armor system coupled to the frame of the vehicle. The armor system includes a ballistics-grade armor panel, at least one insert embedded in the ballistics-grade armor panel, and a bracket coupling the armor system to the frame of the vehicle. The at least one insert has a mass density less than a mass density of the ballistics-grade armor panel. At least a portion of the bracket overlaps at least a portion of the at least one insert. The insert may extend around at least a portion of a periphery of the ballistics-grade armor panel. The armor panel may be made out of any desired material, such as glass, interlayer, acrylic, polycarbonate, plastic, transparent ceramic, ionomers, ionoplasts, or any combinations thereof. The insert may be made out of any desired material, such as ceramics, metals, or glass fibers impregnated with a resin.

The present disclosure is also directed to various embodiments of manufacturing an armor system. In one embodiment, the method includes laminating at least one insert to a ballistics-grade armor panel with an interlayer. Laminating the at least one insert to the ballistics-grade armor panel may include subjecting the interlayer to an elevated temperature and an elevated pressure in an autoclave. The elevated temperature may be at least approximately 150° F. and the elevated pressure may be at least approximately 50 psi. The at least one insert may have a mass density less than a mass density of the ballistics-grade armor panel. The armor panel may be made out of any desired material, such as glass, interlayer, acrylic, polycarbonate, plastic, transparent ceramic, ionomers, ionoplasts, or any combinations thereof. The insert may be made out of any desired material, such as ceramics, metals, or glass fibers impregnated with a resin. The interlayer may be made out of any suitable material, such as polyvinyl butyral (PVB), thermoplastic polyurethanes (TPUs), ethylene-vinyl acetate (EVA), polyethylene terephthalate (PET), or the like.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of an armor system according to the present disclosure are described with reference to the following

DETAILED DESCRIPTION

The present disclosure is directed to various embodiments of an armor system and various methods of manufacturing the armor system. The embodiments of the armor systems of the present disclosure are configured to be coupled to a vehicle (e.g., armored assault vehicle, personnel carrier, military aircraft, or naval ship) or any other structure requiring ballistics protection, such as a building or a structural barrier (e.g., a barricade). The armor systems of the present disclosure, in at least one example embodiment, are configured to absorb the kinetic energy of high-powered projectiles striking the armor systems. In at least one embodiment, the armor systems of the present disclosure are also configured to deflect percussive energy, such as a shock wave, and thereby protect the individuals inside the building, the vehicle cabin, the building, or other structure against nearby explosives or other concussive devices. The armor systems of the present disclosure may be coupled either to a vehicle or building's windows or on non-transparent surfaces of the vehicle or other structure (e.g., the armor systems may be coupled to an outer skin or panel of an armored vehicle). The armor systems of the present disclosure may be configured to provide any desired ballistics protection rating. Additionally, the armor systems of the present disclosure may include a ballistics-grade armor panel, one or more inserts embedded in the armor panel, and at least one bracket overlapping the inserts and configured to couple the armor system to a vehicle or other structure. As described in detail below, the inserts may be configured to reduce the parasitic weight of the armor system by reducing the weight of the ballistics-grade armor panel in a region of overlap between the ballistics-grade armor panel and the bracket.

Figure 1A:
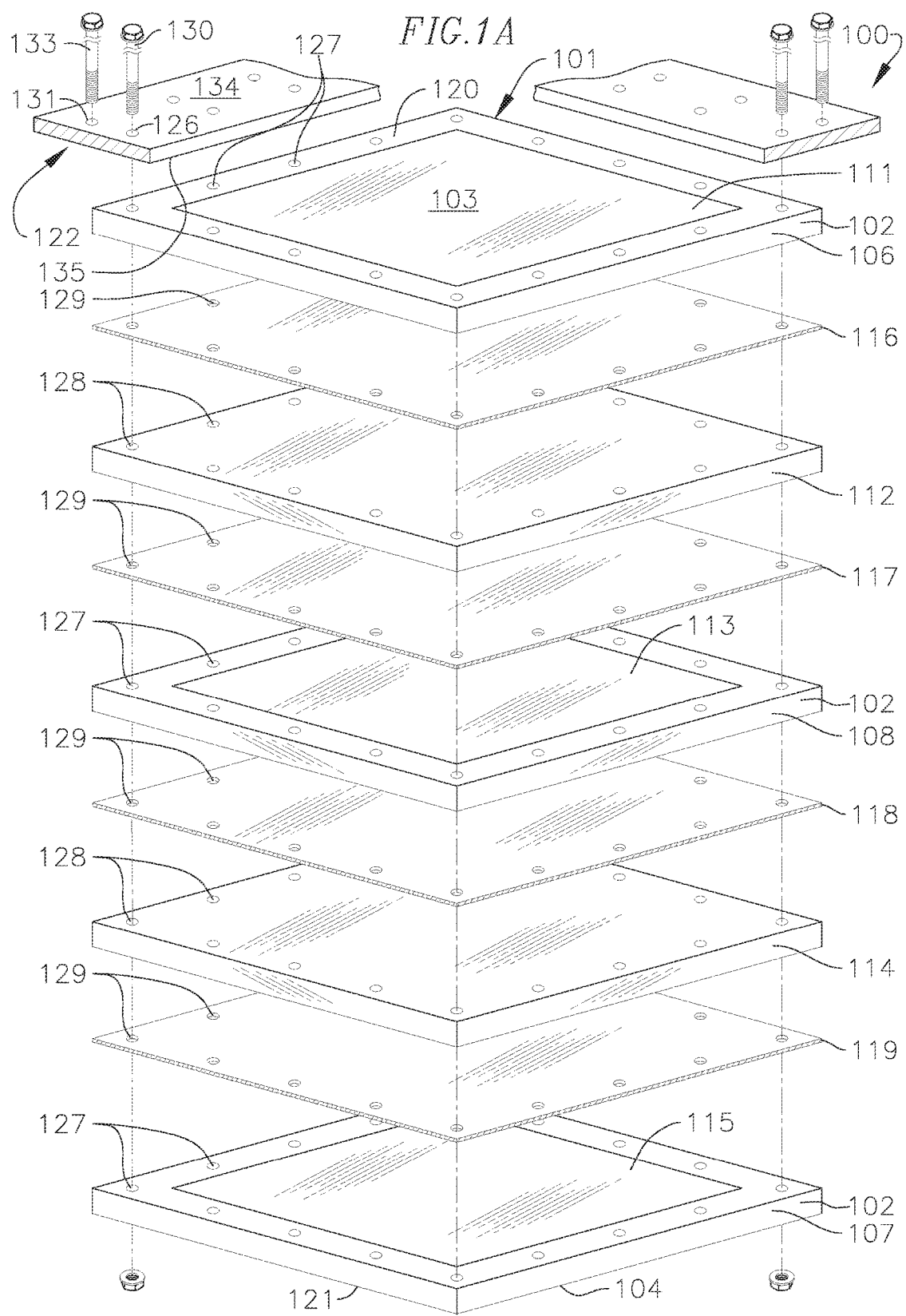
FIGS. 1A and 1B are exploded perspective views of an armor system according to one embodiment of the present disclosure.
Figure 1B:
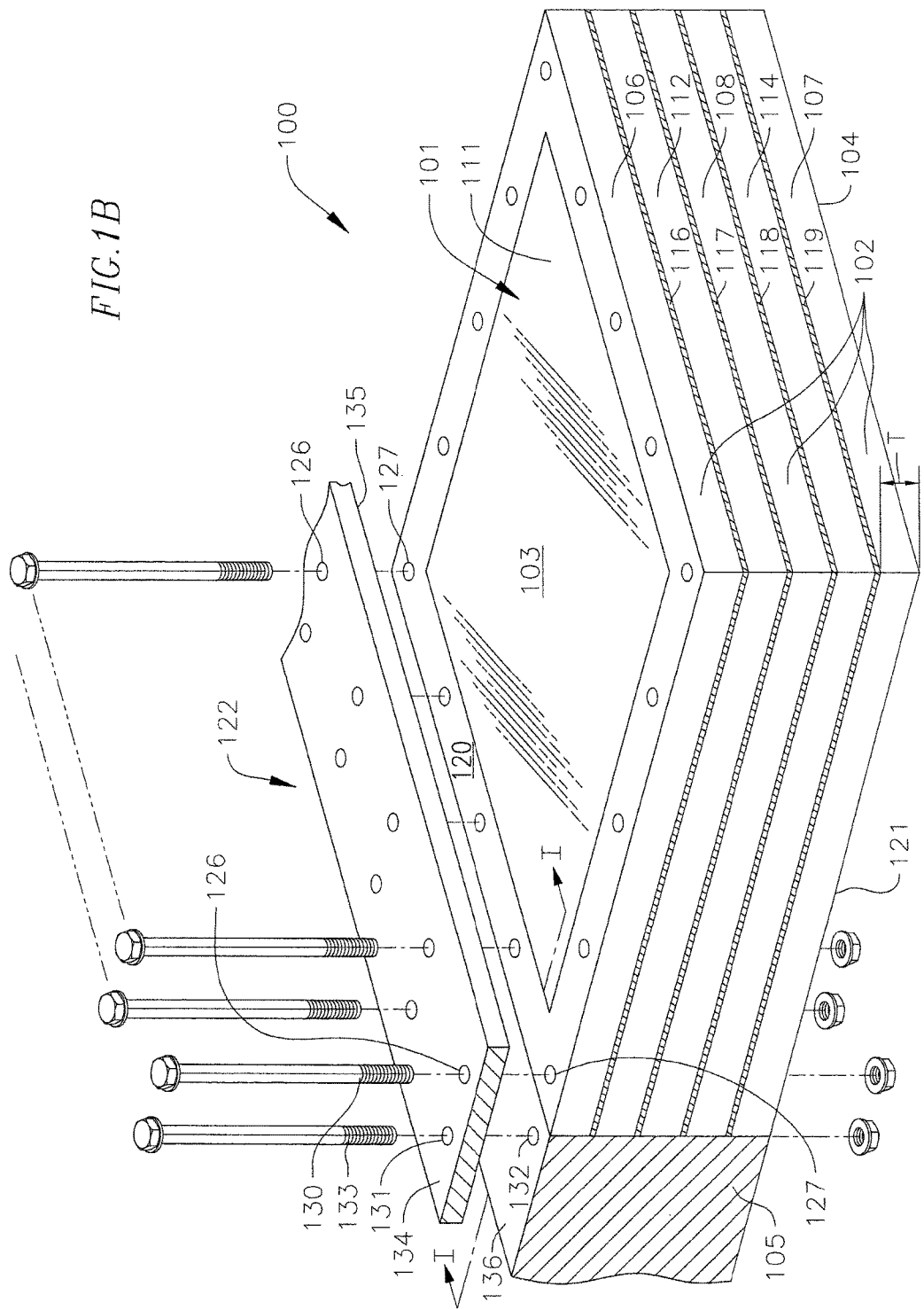
Figure 1C:
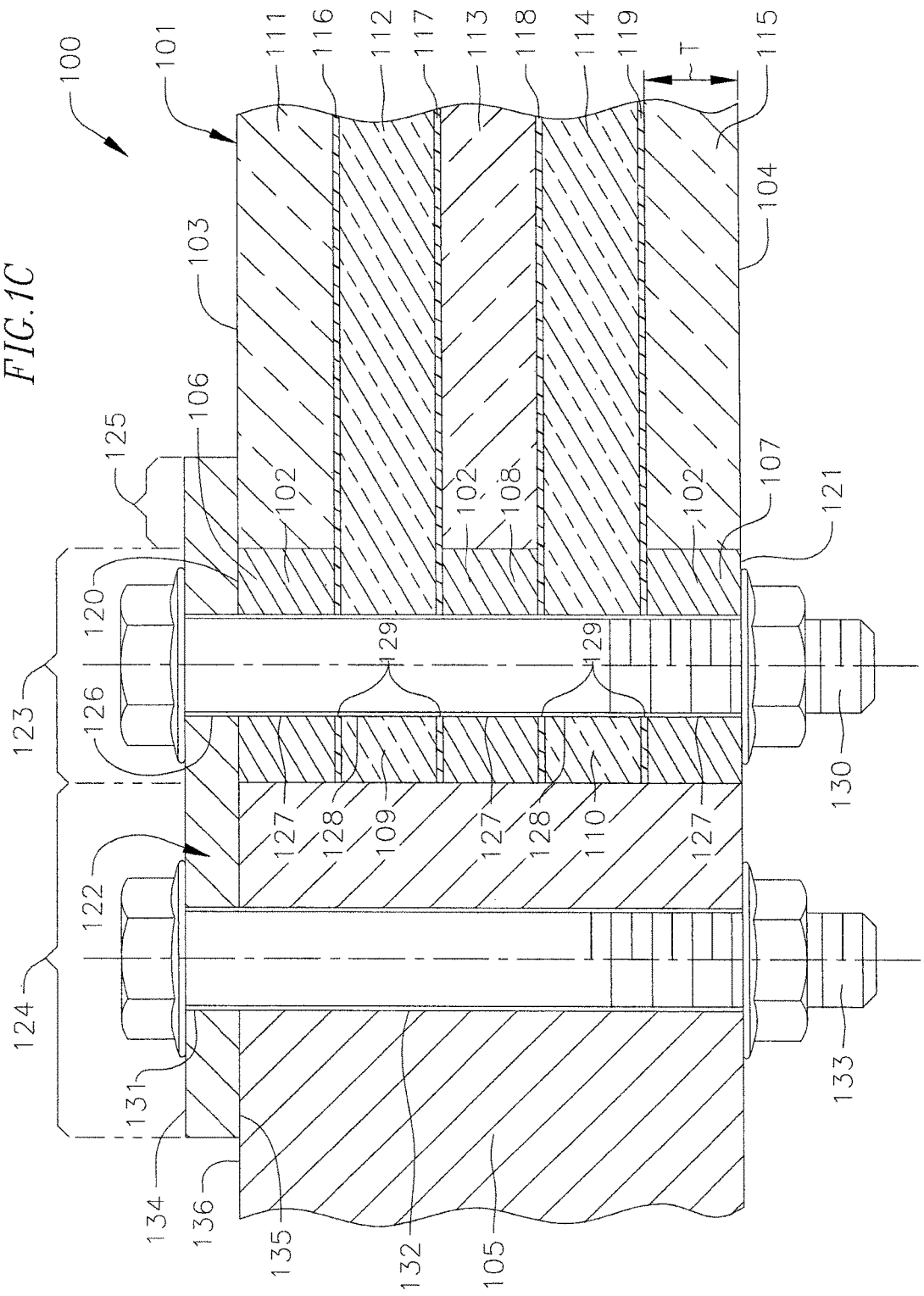
FIG. 1C is a cross-sectional view of the embodiment of the armor system illustrated in FIG. 1B taken along line I-I.

With reference now to FIGS. 1A-1C, an armor system 100 according to one embodiment of the present disclosure includes a ballistics-grade armor panel 101 and at least one insert 102 embedded or inset in the ballistics-grade armor panel 101. As used herein, the term "embedded" shall mean that at least a portion of the embedded component extends below an exterior surface of the component into which it is embedded. The embedded component may be either partially exposed or completely concealed by the component into which it is embedded. In the illustrated embodiment, the ballistics-grade armor panel 101 is a rectangular prism having an outer strike surface 103 and an inner surface 104 opposite the outer strike surface 103. In one or more alternate example embodiments, the ballistics-grade armor panel 101 may have any other desired shape suitable for the intended application of the armor system, such as, for instance, circular, trapezoidal, triangular, or irregularly shaped.

In the embodiment illustrated in FIGS. 1A-1C, the armor system 100 is shown attached to a component 105 of a vehicle or other structure, such as a building (e.g., the component 105 may be a frame surrounding a window in a vehicle or a building). In one embodiment in which the armor system 100 is attached to a frame 105 surrounding a window in the vehicle or other structure, the ballistics-grade armor panel 101 may be configured to substantially match the shape and size of the window. In one or more alternate embodiments, the armor panel 101 may be smaller or larger than the window in the vehicle or other structure in which the armor system 100 is intended to be installed and/or the shape of the armor panel 101 may not match the shape of the window. Additionally, in one or more alternate embodiments, the armor system 100 may be configured to attach to any other part of the vehicle or other structure (e.g., the armor system 100 may be coupled to an outer skin or panel of an armored vehicle or a building).

With continued reference to the embodiment illustrated in FIGS. 1A-1C, the armor system 100 includes an outer insert 106 proximate the outer strike surface 103 of the armor panel 101, an inner insert 107 proximate the inner surface 104 of the armor panel 101, and a middle insert 108 disposed between the outer and inner inserts 106, 107. In the illustrated embodiment, the three inserts 106, 107, 108 are spaced apart by portions 109, 110 of the armor panel 101 extending between adjacent inserts 106, 107, 108. In one embodiment, the portions 109, 110 of the armor panel 101 extending between the inserts 106, 107, 108 are configured to facilitate attachment of the inserts 106, 107, 108 to the armor panel 101, as described in more detail below. Additionally, in the illustrated embodiment, the inserts 106, 107, 108 extend around a periphery of the armor panel 101. Accordingly, in one embodiment, the inserts match or substantially match the shape of the periphery of the armor panel 101. For instance, in an embodiment in which the armor panel 101 is a rectangular prism, the inserts 106, 107, 108 may be square ring shaped. Additionally, in one embodiment, the inserts 106, 107, 108 may extend continuously around the periphery of the armor panel 101, although in one or more alternate embodiments, the inserts 106, 107, 108 may be discontinuous around the periphery of the armor panel 101 (e.g., one or more of the inserts 106, 107, 108 may extend only partially around the periphery of the armor panel 101). Further, although the armor system 100 in the illustrated embodiment includes three inserts 106, 107, 108, in one or more alternate embodiments, the armor system 100 may include any other desired number of inserts 106, 107, 108, such as, for instance, from one to ten inserts, suitable for the intended application and desired characteristics of the armor system 100.

Although in the illustrated embodiment the inserts 106, 107, 108 are embedded in the periphery of the armor panel 101, in one or more alternate embodiments, the inserts 106, 107, 108 may be embedded in any other desired positions along the armor panel 101 (e.g., the inserts 106, 107, 108 may be offset inboard from the periphery of the armor panel 101 and/or located at discrete positions along the armor panel 101).

In one embodiment, the inserts 106, 107, 108 have a lower mass density than the armor panel 101 such that the inserts 106, 107, 108 reduce the parasitic weight of the armor system 100 (e.g., the weight of the inserts 106, 107, 108 may be less than the weight of a volume of the armor panel 101 occupied by the inserts 106, 107, 108). Accordingly, the combined weight of the armor panel 100 and the inserts 106, 107, 108 is less than an otherwise comparable armor system that does not include inserts and in which the armor panel occupies the volume occupied by the inserts. The inserts 106, 107, 108 may be made out of any suitable material depending on the desired physical properties of the inserts 106, 107, 108 (e.g., weight, flexural strength, and ballistics protection properties), such as, for instance, glass fibers impregnated with a resin. The glass fibers may be interlaced into any suitable type of weave, such as, for instance, a twill weave, a 2×2 weave, or a crow weave. The resin may be any suitable type of resin, such as, for instance, phenolic resin, polyester, or epoxy. Additionally, the glass fibers may be any type of glass fibers suitable for the intended application of the armor system 100, such as, for instance, E-glass (alumino-borosilicate glass with less than 1% w/w alkali oxides), A-glass (alkali-lime glass) E-CR-glass (alumino-lime silicate with less than 1% w/w alkali oxides), C-glass (alkali-lime glass with high boron oxide content), D-glass (borosilicate glass), R-glass (alumino silicate glass with calcium oxide (CaO)), or S-glass (alumino silicate glass with high magnesium oxide (MgO) content). In one embodiment, the inserts 106, 107, 108 may be made out of special purpose glass fibers, such as INNOFIBER™, offered by PPG Industries, Inc.

In one or more alternate embodiments, the inserts 106, 107, 108 may be made out of any other suitable material, such as, for instance, metal (e.g., aluminum), ceramic, polyethylene (e.g., high-modulus polyethylene (HMPE) or high-performance polyethylene (HPPE)), aramids (i.e., synthetic fibers), polypropylene (PP), or any combination thereof. For instance, in an embodiment in which the armor panel 101 is made out of an opaque material, such as metal or ceramic composite, the inserts 106, 107, 108 may be made of out any suitable material that has a mass density less than the mass density of the opaque material of the armor panel 101, such as, for instance, aluminum. Additionally, in one embodiment, each of the inserts 106, 107, 108 may be made out of the same material, although in one or more alternate embodiments, the material of the inserts 106, 107, 108 may differ between the inserts 106, 107, 108.

Still referring to the embodiment illustrated in FIGS. 1A-1C, the ballistics-grade armor panel 101 may be either transparent or opaque depending upon the intended application of the armor system 100. For instance, the armor panel 101 may be transparent when the armor system 100 is configured to cover windows in a vehicle or other structure and visibility through the armor panel 101 is desired. The armor panel 101 may be opaque when the armor system 100 is configured to be incorporated into a structural barrier or other structure where visibility through the structure is not desired or required. The transparent armor panel 101 may be composed of any suitable material configured to absorb and deflect kinetic energy and percussive energy, such as, for example, glass, interlayer, acrylic, polycarbonate, plastic, transparent ceramic, ionomers, ionoplasts, or any combinations thereof. The opaque armor panel 101 may be composed of any suitable ballistics-grade material, such as, for example, metal (e.g., steel, titanium), metal alloys, ceramic, composite (e.g., carbon fiber reinforced plastic), aramids (i.e., synthetic fibers), or any combinations thereof.

In the embodiment illustrated in FIGS. 1A-1C, the armor panel 101 includes a stack of alternating glass layers 111, 112, 113, 114, 115 and interlayers 116, 117, 118, 119. In another embodiment, the ballistics-grade armor panel 101 may include a stack of alternating glass layers and interlayers and a polycarbonate layer substituting for one or more of the glass layers. For instance, in one embodiment, the first, third, and fifth layers 111, 113, and 115 may be made out of glass and the second and fourth layers 112 and 114 may be made out of a thermoplastic polymer material (e.g., polycarbonate) or acrylic. The interlayers 116, 117, 118, 119 are configured to mechanically and/or chemically bond the glass layers 111, 112, 113, 114, 115 together into a glazing. In the embodiment illustrated in FIGS. 1A-1C, the armor panel 101 includes five glass layers 111, 112, 113, 114, 115 and four interlayers 116, 117, 118, 119 disposed between adjacent glass layers 111, 112, 113, 114, 115, although in one or more alternate embodiments, the armor panel 101 may include any other suitable number of glass layers and interlayers depending on the desired ballistics protection rating of the armor system 100. The interlayers 116, 117, 118, 119 may be made out of any suitable material, such as, for instance, polyvinyl butyral (PVB), thermoplastic polyurethanes (TPUs), ethylene-vinyl acetate (EVA), polyethylene terephthalate (PET), or the like.

In the embodiment illustrated in FIGS. 1A-1C, the glass layers 111, 112, 113, 114, 115 alternate between relative large and relatively smaller glass panels. In particular, the first, third, and fifth glass panels 111, 113, 115 are smaller than the second and fourth glass panels 112, 114. For instance, in the illustrated embodiment, the first, third, and fifth glass panels 111, 113, 115 are narrower than the second and fourth panels 112, 114 such that the second and fourth panels 112, 114 extend further outward than the first, third, and fifth glass panels 111, 113, 115. Additionally, in the illustrated embodiment, the interlayers 116, 117, 118, 119 cover the same or substantially the same area as the second and fourth glass panels 112, 114 (i.e., the interlayers 116, 117, 118, 119 are coextensive or coterminous with the second and fourth glass panels 112, 114). Accordingly, peripheries of the second glass panel 112 and the first and second interlayers 116, 117 extend between the outer insert 106 and the middle insert 108, and peripheries of the fourth glass layer 114 and the third and fourth interlayers 118, 119 extend between the middle insert 108 and the inner insert 107. Additionally, although the glass layers 111, 112, 113, 114, 115 in the illustrated embodiment each have the same or substantially the same thickness T, in one or more alternate embodiments, the thicknesses of the glass layers 111, 112, 113, 114, 115 may vary. Additionally, in one or more alternate embodiments, one or more of the glass layers 111, 112, 113, 114, 115 may be a laminate of a plurality of glass layers (e.g., one or more of the glass layers 111, 112, 113, 114, 115 may be a glazing of multiple glass layers).

The materials and overall thickness of the armor panel 101 may be configured to provide any desired ballistics protection level, such as a level of ballistics protection in conformity with one or more of the standards promulgated by the National Institute of Justice ("NIJ") (e.g., NIJ Level I to IV or NIJ Standard 0108.01), the Home Office Scientific Development Branch (HOSDB), NATO Standardization Agreement ("STANAG") (e.g., STANAG AEP 55, Volume 1), Underwriters Laboratory ("UL") (e.g., UL-752), EuroNorm (e.g., EuroNorm 1063), and/or any custom criteria.

Still referring to the embodiment illustrated in FIGS. 1A-1C, an outer surface 120 of the outer insert 106 is substantially flush or co-planar with the outer strike surface 103 of the armor panel 101, although in one or more alternate embodiments, the outer surface 120 of the outer insert 106 may be non-coplanar with the outer strike surface 103 of the armor panel 101 (e.g., the outer surface 120 of the outer insert 106 may project above or be recessed below the outer strike surface 103 of the armor panel 101). Similarly, in the illustrated embodiment, an inner surface 121 of the inner insert 107 is substantially flush or co-planar with the inner surface 104 of the armor panel 101, although in one or more alternate embodiments, the inner surface 121 of the inner insert 107 may be non-coplanar with the inner surface 104 of the armor panel 101. As used herein, the term "inner surface" refers to a surface that faces inward toward the building, vehicle, or other structure to which the armor system 100 is coupled. The term "outer surface" refers to a surface that faces away from the building, vehicle, or other structure to which the armor system 100 is coupled.

With continued reference to the embodiment illustrated in FIGS. 1A-1C, the armor system 100 also includes at least one bracket 122 configured to facilitate attachment of the armor system 100 to the component 105 of the vehicle or other structure (e.g., in one embodiment, the bracket 122 may couple the armor system 100 to a frame surrounding a window in the vehicle or other structure, such as a building). A portion 123 of the bracket 122 overlaps the inserts 106, 107, 108 embedded in the armor panel 101 and another portion 124 of the bracket 122 overlaps the component 105 of the vehicle or other structure (i.e., the bracket 122 spans across the inserts 106, 107, 108 embedded in the armor panel 101 and the component 105 of the vehicle or other structure). Additionally, in the illustrated embodiment, a portion 125 of the bracket 122 extends past the inserts 106, 107, 108 and defines a ballistic overlap region. In one or more alternate embodiments, the bracket 122 may not extend past the inserts 106, 107, 108 embedded in the armor panel 101 (e.g., the bracket 122 may be substantially or approximately in-line with the inserts 106, 107, 108).

The portion 123 of the bracket 122 overlapping the inserts 106, 107, 108 defines at least one opening 126 (e.g., a hole) axially aligned with openings 127, 128, 129 (e.g., holes) in the inserts 106, 107, 108, the second and fourth glass layers 112, 114, and the interlayers 116, 117, 118, 119, respectively. The aligned openings 126, 127, 128, 129 are configured to receive a fastener 130 coupling the bracket 122 to the armor panel and the inserts 106, 107, 108 (i.e., the fastener 130 extends through the openings 126, 127, 128, 129 in the bracket 122, the inserts 106, 107, 108, the second and fourth glass layers 112, 114, and the interlayers 116, 117, 118, 119). Similarly, the portion 124 of the bracket 122 overlapping the component 105 of the vehicle or other structure defines at least one opening 131 aligned with an opening 132 in the component 105. The aligned openings in the 130, 131 in the bracket 122 and the component 105 are configured to receive a fastener 133 coupling the bracket 122 to the component 105. The fasteners 130, 133 may be either permanent fasteners (e.g., rivets) or removable fasteners (e.g., hex bolts and nuts) configured to facilitate detachment and reattachment of the armor system 100 to the component 105 of the vehicle or other structure. In one embodiment, the armor system 100 may also include bushings receiving the fasteners 130, 133 coupling the bracket 122 to the armor panel 101 and the component 105, respectively. In one or more alternate embodiments, the armor panel 101 may be provided without the openings 127, 128, 129 depending on the configuration of the bracket 122 and the nature of the connection between the armor panel 101 and the bracket 122 (e.g., in one embodiment, the bracket 122 may be a C-channel and the armor panel 101 may be press-fit into the C-channel bracket 122).

The bracket 122 may have any desired size and shape suitable for the configuration of the armor panel 101 and the embedded inserts 106, 107, 108, the configuration of the component 105 of the vehicle or other structure, and the desired configuration of the joint between the armor panel 101 and the component 105 of the vehicle or other structure. For instance, in the embodiment illustrated in FIGS. 1A-1C, the bracket 122 is a substantially flat plate having an outer surface 134 and an inner surface 135 opposite the outer surface 134. The flat bracket 122 facilitates installing the armor panel 101 and the embedded inserts 106, 107, 108 in-line with the component 105 of the vehicle or other structure such that the outer strike surface 103 of the armor panel 101 is substantially flush or co-planar with an outer surface 136 of the component 105 of the vehicle or other structure to which the armor system 100 is installed (e.g., the flat bracket 122 facilitates a butt joint between the armor panel 101 and the component 105 of the vehicle or other structure). Additionally, in the illustrated embodiment, the inner surface 135 of the flat bracket 122 abuts the outer surfaces 136, 120, 103 of the component 105, the outer insert 106, and the armor panel 101, respectively. The bracket 122 may be made out of any material suitable for the desired ballistics protection rating of the armor system 100, such as, for instance, metal (e.g., steel). In one embodiment, the thickness and material of the bracket 122 may be selected such that the bracket 122 has substantially the same ballistics protection rating as the component 105 of the vehicle or other structure and/or the same ballistics protection rating as the armor panel 101. Additionally, although the bracket 122 has been described above as a separate part or member from the component 105 of the vehicle or other structure, in one or more alternate embodiments, the bracket 122 may be an integral portion of the component 105 of the vehicle or other structure (e.g., the bracket 122 may be integrally formed with, or permanently fixed to, the component 105 of the vehicle or other structure to which the armor system 100 is configured to be coupled).

In addition to reducing the parasitic weight of the armor system 100, as described above, the inserts 106, 107, 108 may be configured to provide flexibility and thereby increase the integrity of the structural connection between the armor panel 101 and the component 105 of the vehicle or other structure to which the armor panel 101 is attached. For instance, in one embodiment, the armor panel 101 may be made out of one or more relatively brittle materials (e.g., glass) that are not well-suited to absorb tension loads (e.g., when the armor panel 101 is struck by a projectile or a percussive wave, the periphery of the armor panel 101 is placed in tension). Accordingly, in one embodiment, the inserts 106, 107, 108 may be made out of a relatively more flexible material (e.g., glass fibers impregnated with a resin) than the armor panel 101 such that the flexibility of the inserts 106, 107, 108 may absorb these tension loads and thereby increase the structural integrity of the armor system 100. Additionally, the inserts 106, 107, 108 may also be configured to absorb mechanical loads transmitted through the fastener 130 coupling the bracket 122 to the armor panel 101 and the inserts 106, 107, 108.

Figure 2:
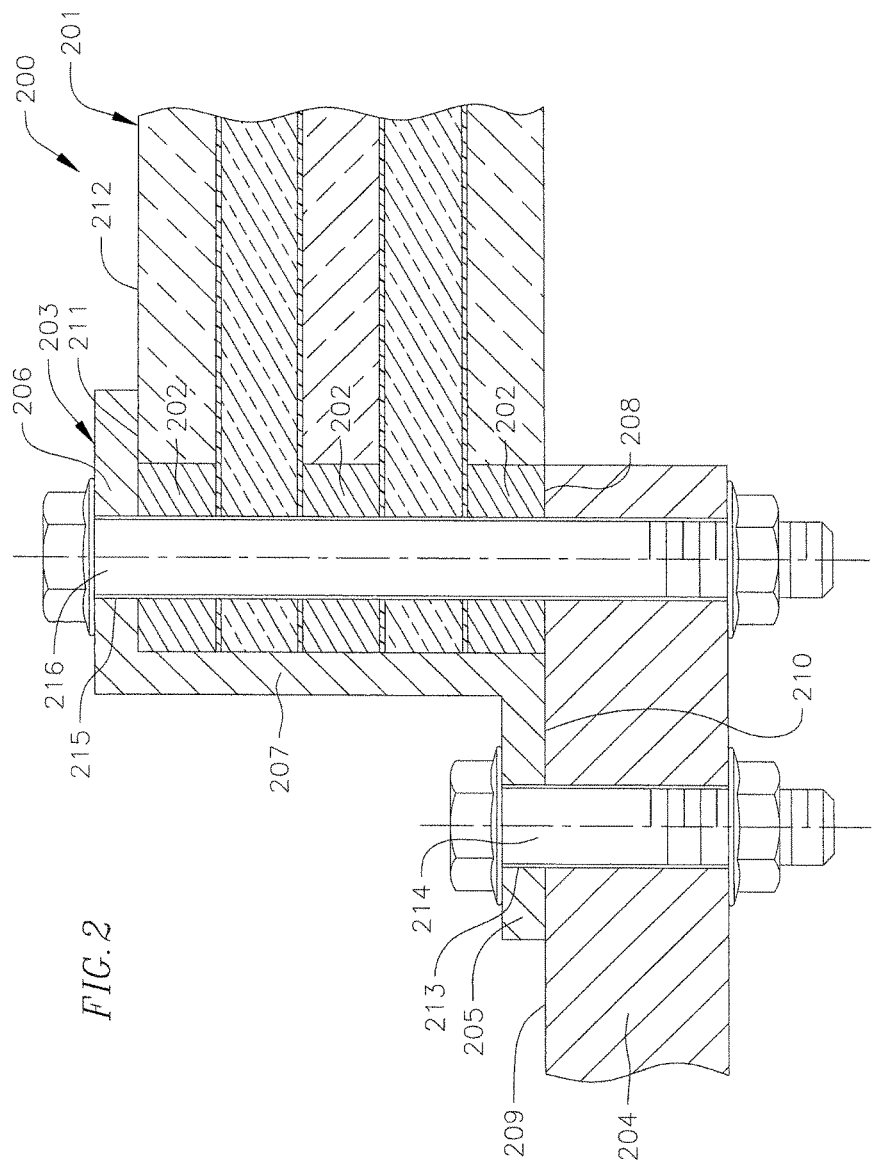
FIG. 2 is a cross-section view of an armor system according to another embodiment of the present disclosure.

With reference now to FIG. 2, an armor system 200 according to another embodiment of the present disclosure includes an armor panel 201, one or more inserts 202 embedded in the armor panel 201, and a bracket 203 configured to couple the armor system 200 to a component 204 of a vehicle or other structure, such as a building. The armor panel 201 and the one or more inserts 202 may be the same or similar to the armor panel 101 and the inserts 102 described above with reference to FIGS. 1A and 1B, and therefore these components will not be described in any further detail below. In the embodiment illustrated in FIG. 2, the bracket 203 is a Z-channel having an inner leg 205, an outer leg 206, and a transverse leg 207 interconnecting the inner and outer legs 205, 206. The Z-channel bracket 203 is configured to facilitate coupling the armor panel 201 and the embedded inserts 202 to the component 204 of the vehicle or other structure in a lap joint configuration (e.g., the Z-channel bracket 203 facilitates a configuration in which an inner surface 208 of an inner insert 202 abuts an outer surface 209 of the component 204 of the vehicle or other structure). Additionally, in the illustrated embodiment, an inner surface 210 of the inner leg 205 of the Z-channel bracket 203 abuts the outer surface 209 of the component 204 of the vehicle or other structure and an inner surface 211 of the outer leg 206 of the Z-channel bracket 203 abuts an outer surface 212 of the armor panel 201. The inner leg 205 of the Z-channel bracket 203 also defines one or more openings 213 configured to receive one or more fasteners 214 coupling the Z-channel bracket 203 to the component 204 and the outer leg 206 defines one or more openings 215 configured to receive one or more fasteners 216 coupling the Z-channel bracket 203 to the armor panel 201 and the one or more inserts 202 embedded in the armor panel 201. The fasteners 214, 216 may be either permanent fasteners (e.g., rivets) or removable fasteners (e.g., hex bolts and nuts) configured to facilitate detachment and reattachment of the armor system 200 to the vehicle or other structure.

Figure 3:
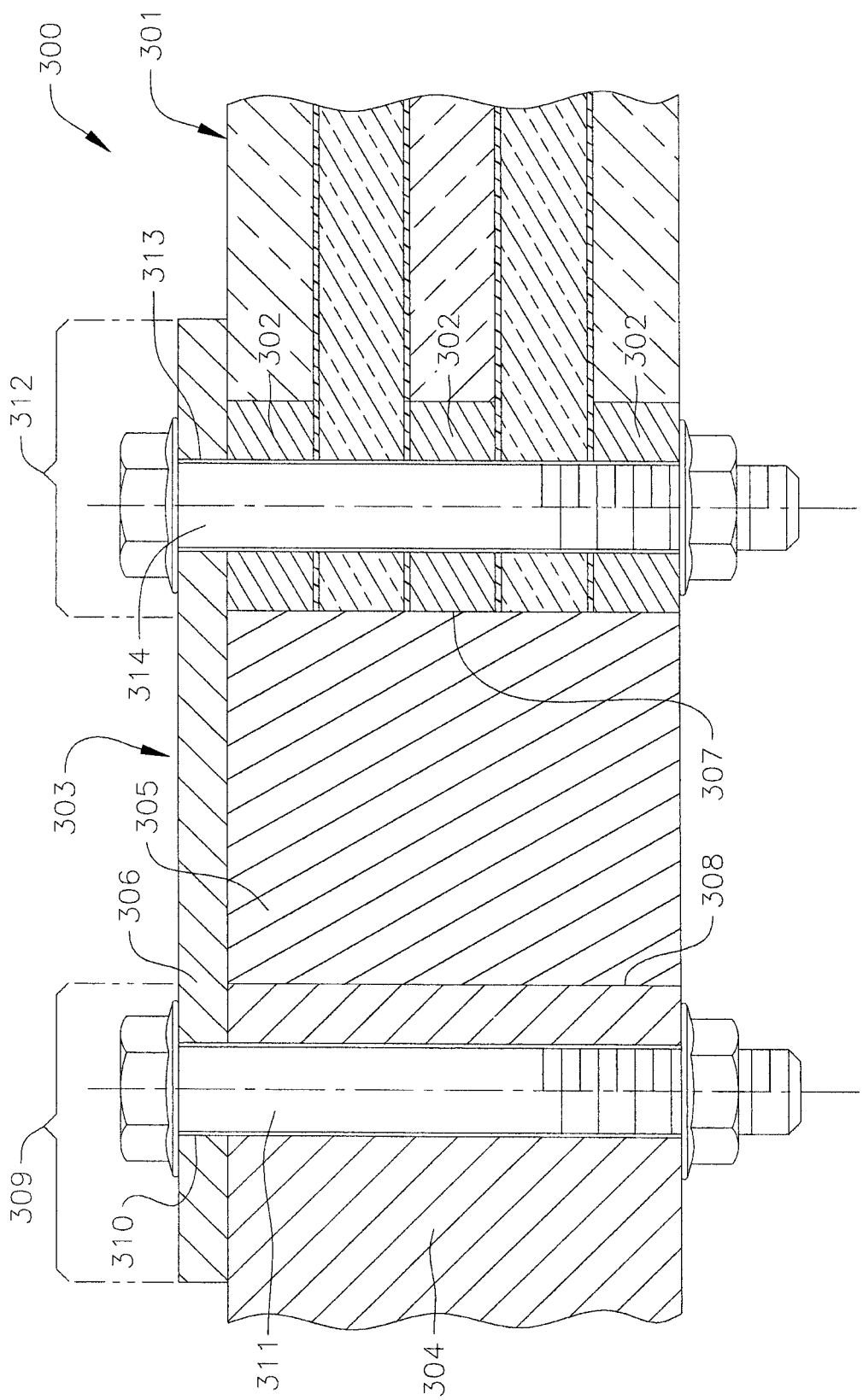
FIG. 3 is a cross-sectional view of an armor system according to a further embodiment of the present disclosure.

With reference now to FIG. 3, an armor system 300 according to another embodiment of the present disclosure includes an armor panel 301, one or more inserts 302 embedded in the armor panel 301, and a bracket 303 configured to couple the armor system 300 to a component 304 of a vehicle or other structure, such as a building. In one embodiment, the armor panel 301 and the one or more inserts 302 may be the same or similar to the armor panel 101 and the inserts 102 described above with reference to FIGS. 1A-1C, and therefore these components will not be described in any further detail below. In the illustrated embodiment, the bracket 303 includes a mullion 305 and a cover plate 306. The mullion 305 is configured to space an edge 307 of the armor panel 301 and the embedded inserts 302 apart from an edge 308 of the component 304 (e.g., the mullion 305 is a divider spacing the armor panel 301 and the embedded inserts 302 apart from the component 304 of vehicle or other structure). In the illustrated embodiment, the mullion 305 is a rod or a bar having a square cross-section and the cover plate 306 is a flat plate, although in one or more alternate embodiments, the mullion 305 and the cover plate 306 may have any other suitable shapes. The cover plate 306 is configured to span across a portion of the component 304, the mullion 305, and a portion of the armor panel 301. The cover plate 306 is also configured to overlap at least a portion of the one or more inserts 302 embedded in the armor panel 301. The portion 309 of the cover plate 306 overlapping the component 304 defines at least one opening 310 configured to receive a fastener 311 coupling the cover plate 306 to the component 304. Similarly, the portion 312 of the cover plate 306 overlapping the armor panel 301 and the inserts 302 defines at least one opening 313 configured to receive a fastener 314 coupling the cover plate 306 to the armor panel 301 and the one or more inserts 302 embedded in the armor panel 301. The fasteners 311, 314 may be either permanent fasteners (e.g., rivets) or removable fasteners (e.g., hex bolts and nuts) configured to facilitate detachment and reattachment of the armor system 300 to the component 304 of the vehicle or other structure. In one embodiment, the cover plate 306 and the mullion 305 may be separate components coupled together by any suitable process, such as, for instance, bonding, welding, mechanical fastening, or any combination thereof. In one or more alternate embodiments, the cover plate 306 and the mullion 305 may be integrally formed, such as by an extrusion forming process. In one embodiment, the embodiment of the armor system 300 illustrated in FIG. 3 may be similar to the embodiment of the armor system 100 illustrated in FIGS. 1A-1C with the addition of a mullion 305 separating the armor panel 301 and the embedded inserts 302 from the component 304 of the vehicle or other structure.

With reference now to the flowchart illustrated in FIG. 4, a method 400 of manufacturing an armor system 100, 200, 300 according to one embodiment of the present disclosure and attaching the armor system 100, 200, 300 to a component in a vehicle or other structure will be described. In one embodiment, the method 400 of manufacturing the armor system 100, 200, 300 includes a task 410 of manufacturing a ballistics-grade armor panel 101, 201, 301. In one embodiment, the task 410 of manufacturing the armor panel 101, 201, 301 includes alternately stacking layers of glass panels and interlayers. For instance, in one embodiment, the task 410 of manufacturing the armor panel 101, 201, 301 includes alternately stacking five glass layers 111, 112, 113, 114, 115 and four interlayers 116, 117, 118, 119, as illustrated in FIGS. 1A-1C, although in one or more alternate embodiments, any other number of layers may be stacked depending on the desired characteristics of the armor panel 101, 201, 301. As described above, the interlayers 116, 117, 118, 119 may be made of any suitable material, such as, for instance, polyvinyl butyral (PVB), thermoplastic polyurethanes (TPUs), ethylene-vinyl acetate (EVA), polyethylene terephthalate (PET), or the like.

Additionally, in one or more alternate embodiments, the armor panel 101, 201, 301 may be manufactured out of any other suitable material, such as, for instance, transparent materials (e.g., acrylic, polycarbonate, plastic, transparent ceramic, ionomers, ionoplasts, or any combinations thereof) or opaque materials (e.g., metal (e.g., steel or titanium), metal alloys, ceramic, composite (e.g., carbon fiber reinforced plastic), aramids (i.e., synthetic fibers), or any combinations thereof) depending on the desired characteristics of the armor panel 101, 201, 301. The materials and thickness of the armor panel 101, 201, 301 may be selected based on the intended application of the armor system 100, 200, 300 and the desired ballistics-protection rating of the armor panel 101, 201, 301. In an alternate embodiment, the method 400 may include a task of obtaining a pre-fabricated armor panel 101, 201, 301.

Figure 4:
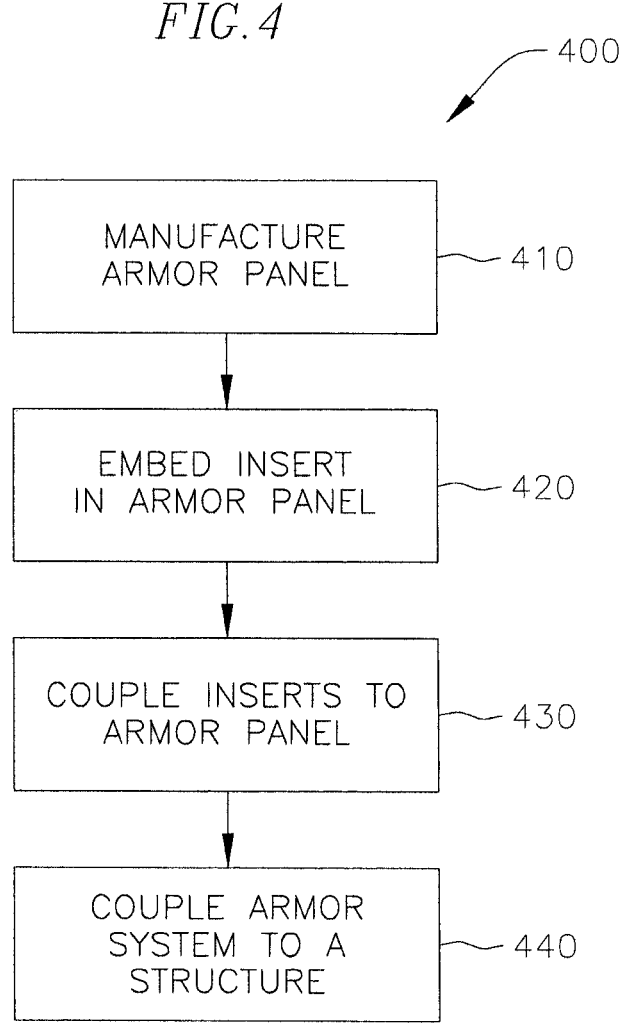
FIG. 4 is a flowchart illustrating tasks of manufacturing an armor system according to one embodiment of the present disclosure.

With continued reference to FIG. 4, the method 400 of manufacturing the armor system 100, 200, 300 also includes a task 420 of embedding one or more inserts 102, 202, 302 in the armor panel 101, 201, 301. In one embodiment, the task 420 of embedding the inserts 102, 202, 302 in the armor panel 101, 201, 301 includes placing an outer insert 106, a middle insert 108, and an inner insert 107 around a periphery of the armor panel 101 such that the second glass layer 112 and the first and second interlayers 116, 117 extend between the outer insert 106 and the middle insert 108 and the fourth glass layer 114 and the third and fourth interlayers 118, 119 extend between the middle insert 108 and the inner insert 107, as illustrated in FIGS. 1A-1C. Additionally, although in one embodiment the inserts 102, 202, 302 may be placed around the periphery of the armor panel 101, 201, 301, in one or more alternate embodiments, the method 400 may include placing the one or more inserts 102, 202, 302 at any other desired locations along or in the armor panel 101, 201, 301. Additionally, in one embodiment, the task 420 of embedding one or more inserts 102, 202, 302 in the armor panel 101, 201, 301 may include forming notches or recesses in the armor panel 101, 201, 301 by any suitable process (e.g., waterjet cutting or machining) and then inserting the inserts 102, 202, 302 into the notches or recesses.

Still referring to FIG. 4, the method 400 also includes a task 430 of coupling the one or more inserts 102, 202, 302 to the armor panel 101, 201, 301. In one embodiment, the task 430 of coupling the one or more inserts 102, 202, 302 to the armor panel 101, 201, 301 includes subjecting the armor panel 101, 201, 301 and the one or more inserts 102, 202, 302 to an elevated temperature and an elevated pressure, such as, for instance, in an autoclave lamination process. In one embodiment, the elevated temperature may be at least approximately 150° F. and the elevated pressure may be at least approximately 50 psi. In one embodiment in which the armor panel 101, 201, 301 includes a stack of glass layers 111, 112, 113, 114, 115 and interlayers 116, 117, 118, 119, during the task of subjecting the armor panel 101, 201, 301 and the one or more inserts 102, 202, 302 to an elevated temperature and an elevated pressure, the interlayers 116, 117, 118, 119 are configured to melt and thereby mechanically and/or chemically bond the glass layers 111, 112, 113, 114, 115 together and mechanically and/or chemically bond the inserts 102, 202, 302 to the armor panel 101, 201, 301. In an embodiment in which the inserts 102, 202, 302 are made out of a composite material (e.g., glass fibers impregnated with a resin), a portion of the interlayers 116, 117, 118, 119 may be drawn into the glass fibers, thereby adhering the inserts 102, 202, 302 to the armor panel 101, 201, 301 (i.e., a portion of the interlayer 116, 117, 118, 119 may be infused into the glass fibers of the inserts 102, 202, 302 due to the elevated temperature and pressure during the autoclave lamination process, thereby laminated the inserts 102, 202, 302 to the armor panel 101, 201, 301). In one or more alternate embodiments, the alternating stack of glass layers 111, 112, 113, 114, 115 and interlayers 116, 117, 118, 119 may be subject to a first autoclave lamination process during which the interlayers 116, 117, 118, 119 melt and thereby mechanically and/or chemically bond the glass layers 111, 112, 113, 114, 115 together into a glazing to form the armor panel 101, 201, 301. The inserts 102, 202, 302 may then be embedded into the armor panel 101, 201, 301 (e.g., in or between one or more of the glass layers 111, 112, 113, 114, 115) and then the combined assembly of the inserts 102, 202, 302 and the armor panel 101, 201, 301 may be subject to a second autoclave lamination process during which the interlayers 116, 117, 118, 119 melt and thereby mechanically and/or chemically bond the inserts 102, 202, 302 to the armor panel 101, 201, 301.

With continued reference to the flowchart illustrated in FIG. 4, the method 400 may also include a task 440 of coupling the armor system 100, 200, 300 to any desired structure (e.g., a frame surrounding a window in a vehicle or building). In one embodiment, the task 440 of coupling the armor system 100, 200, 300 to the desired structure includes using a bracket having the desired configuration, such as, for instance, a flat bracket 122 (FIGS. 1A-1C), a Z-channel bracket 203 (FIG. 2), or a bracket 303 (FIG. 3) having a mullion 305 and a cover plate 306 (FIG. 3), and installing fasteners coupling the bracket 122, 203, 303 to the armor panel 101, 201, 301, the embedded inserts 102, 202, 302, and the component 105, 204, 304 of the vehicle or other structure.

Although the armor systems 100, 200, 300 of the present disclosure have been described with reference to providing protection against ballistic strikes and/or percussive waves associated with a nearby explosion, in one or more alternate embodiments, the embodiments of the present disclosure may not be configured to provide ballistics-grade protection. For instance, in one embodiment, the ballistics-grade armor panel 101, 201, 301 may be replaced by a standard glass panel used in architectural applications (e.g., a window, a partition, an awning, or an atrium).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. An armor system, comprising:
    a ballistics-grade armor panel comprising a plurality of ballistic layers and a plurality of interlayers alternately arranged in a stack; and
    a plurality of inserts arranged in a stack and embedded in the ballistics-grade armor panel, wherein each of the plurality of inserts has a mass density less than a mass density of the ballistics-grade armor panel.

2. The armor system of claim 1, wherein each of the plurality of inserts extends around at least a portion of a periphery of the ballistics-grade armor panel.

3. The armor system of claim 1, wherein a material of the ballistics-grade armor panel is selected from the group of transparent materials consisting of glass, interlayer, acrylic, polycarbonate, plastic, transparent ceramic, ionomers, ionoplasts, and any combinations thereof.

4. The armor system of claim 1, wherein a material of the plurality of inserts is selected from the group of materials consisting of ceramics, metals, aramids, polyethylene, polypropylene, glass fibers impregnated with a resin, and combinations thereof.

5. The armor system of claim 1, wherein:
    the plurality of ballistic layers comprises a plurality of glass layers;
    the plurality of inserts comprises a first insert and a second insert spaced apart from the first insert; and
    at least one glass layer and at least one interlayer extend between the first and second inserts.

6. The armor system of claim 5, wherein the first insert is on an outer surface of the ballistics-grade armor panel and the second insert is on an inner surface of the ballistics-grade armor panel.

7. The armor system of claim 1, further comprising a bracket configured to couple the armor system to a vehicle or a structure, wherein a portion of the bracket is configured to overlap at least a portion of at least one of said plurality of inserts.

8. The armor system of claim 7, further comprising:
at least one fastener extending through the portion of the bracket overlapping said plurality of inserts and through said plurality of inserts.

9. The armor system of claim 7, wherein the bracket is a flat plate.

10. The armor system of claim 7, wherein the bracket is a Z-channel.

11. An armored vehicle, comprising:
a vehicle, comprising:
at least one window; and
a frame surrounding the at least one window;
an armor system coupled to the frame of the vehicle, the armor system comprising:
a ballistics-grade armor panel comprising a plurality of ballistic layers and a plurality of interlayers alternately arranged in a stack; and
a plurality of inserts arranged in a stack and embedded in the ballistics-grade armor panel, wherein each of the plurality of inserts has a mass density less than a mass density of the ballistics-grade armor panel; and
a bracket coupling the armor system to the frame of the vehicle, wherein at least a portion of the bracket overlaps at least a portion of at least one the plurality of said inserts.

12. The armored vehicle of claim 11, wherein each of the plurality of inserts extends around at least a portion of a periphery of the ballistics-grade armor panel.

13. The armored vehicle of claim 11, wherein a material of the ballistics-grade armor panel is selected from the group of transparent materials consisting of glass, interlayer, acrylic, polycarbonate, plastic, transparent ceramic, ionomers, ionoplasts, and any combinations thereof.

14. The armored vehicle of claim 11, wherein a material of the plurality of inserts is selected from the group of materials consisting of ceramics, metals, aramids, polyethylene, polypropylene, glass fibers impregnated with a resin, and combinations thereof.

15. A method of manufacturing an armor system, comprising:
a first lamination task comprising laminating a plurality of ballistic layers together with a plurality of interlayers to form a ballistics-grade armor panel; and
a second lamination task comprising laminating a plurality of inserts, one over the other, to the ballistics-grade armor panel with an interlayer, wherein each of said plurality of inserts has a mass density less than a mass density of the ballistics-grade armor panel,
wherein the second lamination task comprises subjecting the plurality of inserts, the ballistics-grade armor panel, and the interlayer to a temperature of at least approximately 150° F. and a pressure of at least approximately 50 psi.

16. The method of claim 15, wherein the second lamination task is performed in an autoclave.

17. The method of claim 15, wherein a material of the ballistics-grade armor panel is selected from the group of transparent materials consisting of glass, interlayer, acrylic, polycarbonate, plastic, transparent ceramic, ionomers, ionoplasts, and any combinations thereof.

18. The method of claim 15, wherein a material of the plurality of inserts is selected from the group of materials consisting of ceramics, metals, aramids, polyethylene, polypropylene, glass fibers impregnated with a resin, and combinations thereof.

19. The method of claim 15, wherein the interlayer comprises a material selected from the group of materials consisting of polyvinyl butyral, thermoplastic polyurethane, ethylene-vinyl acetate, and polyethylene terephthalate.

\* \* \* \* \*

UNITED STATES PATENT AND TRADEMARK OFFICE
CERTIFICATE OF CORRECTION

PATENT NO. : 9,803,959 B2
APPLICATION NO. : 14/318195
DATED : October 31, 2017
INVENTOR(S) : Carlo A. Scarinci et al.

It is certified that error appears in the above-identified patent and that said Letters Patent is hereby corrected as shown below:

In the Claims

Column 13, Line 33,     Delete "one the plurality",
Claim 11                Insert --one of the plurality--

Signed and Sealed this
Eighteenth Day of September, 2018

Andrei Iancu
*Director of the United States Patent and Trademark Office*